United States Patent [19]

Chauvel

[11] Patent Number: 4,620,289

[45] Date of Patent: Oct. 28, 1986

[54] VIDEO DISPLAY SYSTEM

[75] Inventor: Gerard Chauvel, Cagnes, France

[73] Assignee: Texas Instruments Incorporated, Dallas, Tex.

[21] Appl. No.: 583,074

[22] Filed: Feb. 23, 1984

[30] Foreign Application Priority Data

Apr. 25, 1983 [FR] France ................................ 83 06741

[51] Int. Cl.[4] ........................ G06F 3/153; G06K 15/20

[52] U.S. Cl. .................................... 364/521; 340/720; 340/723; 364/514

[58] Field of Search ........................ 364/514, 521, 518; 358/11, 18; 340/720, 723, 750, 793

[56] References Cited

U.S. PATENT DOCUMENTS 4,481,594 11/1984 Staggs et al. ........................ 364/521
4,484,187 11/1984 Brown et al. .................... 340/723 X
4,490,797 12/1984 Staggs et al. ........................ 364/522
4,496,944 1/1985 Collmeyer et al. ................. 340/723

OTHER PUBLICATIONS

Clifford, C. et al, "Microprocessor-Based TV Controller", New Electronics, vol. 12, No. 7, Apr. 3, 1979, pp. 26+.

*Primary Examiner*—Felix D. Gruber
*Assistant Examiner*—H. R. Herndon
*Attorney, Agent, or Firm*—Robert D. Marshall, Jr.; N. Rhys Merrett; Melvin Sharp

[57] ABSTRACT

In this apparatus, a composite memory 5 includes a managing memory (5*g*) containing for each line of the frame to be displayed, a word made up of information relating to the composition of the line in question. This information can define a base color, the number of memory planes, and, if appropriate, a base address of a zone of a zone memory (5*z*) which contains the data relating to the parts of the image which contain only typographic or graphic information. If the number of planes is equal to zero, said base color becomes a constant background color in the totality of the line to be displayed. The contents of the control memory are read out, word by word, from the control memory at the frequency of the line synchronization signal for the screen.

Application to teletext systems.

9 Claims, 7 Drawing Figures

| | FRAME REGION | LINE Nb | BASECOLOR | PLANES | MEMORY ZONE ADD | | |
|---|---|---|---|---|---|---|---|
| 1 | BACK GROUND ZONE | 1 | C 1 | 0 0 0 | | | BAGT |
| | | 2 | | 0 0 0 | | | BAGT+1 |
| | | 3 | | 0 0 0 | | | • |
| | | 4 | | 0 0 0 | | | • |
| | | 20 | C 1 | 0 0 0 | | | |
| 2 | TEXT ZONE 2 COLORS | 21 | C 2 | 0 0 1 | 1 2 | 3 F | |
| | | 22 | C 2 | 0 0 1 | | | |
| | | 27 | C 2 | 0 0 1 | | | |
| 3 | BACKGROUND ZONE | 28 | C 2 | 0 0 0 | | | |
| | | 29 | C 2 | 0 0 0 | | | |
| | | 30 | C 2 | 0 0 0 | | | |
| 4 | GRAPHIC ZONE MULTICOLOR | 31 | C 5 | 1 0 0 | 2 4 | 0 0 | |
| | | 32 | | 1 0 0 | | | |
| | | 33 | | 1 0 1 | | | |
| | | 34 | | 1 0 1 | | | |
| | | 35 | | 1 0 1 | | | |
| | | 36 | | 1 0 0 | | | |
| | | 37 | | 1 0 0 | | | |
| | | 50 | C 5 | 1 0 0 | | | |
| 5 | BACKGROUND ZONE | 51 | C 3 | 0 0 0 | | | |
| | | 52 | C 3 | 0 0 0 | | | |
| | | 200 | C 3 | 0 0 0 | | | |
| 6 | TEXT ZONE 4 COLORS | 201 | C 6 | 0 1 0 | 1 5 | 0 0 | |
| | | 202 | C 6 | 0 1 0 | | | |
| | | 207 | C 6 | 0 1 0 | | | |
| 7 | BACKGROUND ZONE | 208 | C 4 | 0 0 0 | | | |
| | | 250 | C 4 | 0 0 0 | | | |

5G

*Fig. 4*

VIDEO DISPLAY SYSTEM

The instant invention concerns the video display of images by sweep frames, line by line, and point by point, from image data stored temporarily in a random access memory, the contents of which are brought up to date in a manner which evolves with the variations in the image composition to be displayed. This type of display is utilized particularly in teletext display systems.

In known display systems utilizing the above described techniques, a page memory is used which contains for each frame, the totality of the color information for all of the frame points, this information being defined by a certain number of "memory planes". These memory planes are conceptually formed by all of the data of the frame necessary for displaying a distinct color of the image, each plane representing, thus, all of the points of the frame to be displayed in this color by means of a single bit per point. The utilization of N planes permits thus the display of $2^N$ colors on the viewing screen.

In the known systems, the contents of the N planes are sequentially read under control of a time base circuit, which also controls the frame and line sweepings of the screen, the reading of the planes being effected thus in synchronism with the sweepings and all of the points being, therefore, selectively defined in the memory planes. The bits making up a part of the memory plane can be stored in the memory at addresses distributed according to need, and so the different planes can be interlaced or intermixed among each other.

In general, the number of planes is fixed by an assembly of a memory and integrated components, which entails a rigid organization which is not adapted to account for dynamic variations during the display of a page on the screen. In other terms, the lines, or groups of lines, do not include color variations and are entirely defined in the different planes of the page memory for generating corresponding colors on the screen. The display is therefore effected page by page, which is to say that the memory capacity must be at least equal to that necessary for storing the data regarding the points of two pages or more.

The invention has as an object a system of the above general type in which the capacity of the memory can be considerably reduced, while also allowing dynamic modifications of the image with great flexibility.

The invention has therefore as an object an apparatus for displaying video images on the screen of a cathode ray tube by frame sweeping, line by line, and point by point, this device including a composite memory in which are stored the image data to be displayed for each frame, this composite memory being connected to a video display processor controlling said screen, and to a central processing unit for permitting the composition of the image by means of said memory, the extraction from this memory of the data relating to the points to be displayed being assured under control of a time base circuit in synchronism with the sweeping of the screen, this device being characterized in that said composite memory includes, on the one hand, a control memory for the memorization of a data word for each line making up a part of the image to be displayed, each word containing the composition data of said line and, on the other hand, a zone memory for the memorization of the image data relating exclusively to the zones of the image in which the intelligible information is to be displayed, and the devide is further characterized in that it also includes means for coordinating during the display, the extraction of the data from the two memories.

Because of these characteristics, each image is stored before display as to its general characteristics in the control memory and, as to the image data themselves (text or graphical portions), in only certain zones of the memory. In this manner, the quantity of information stored for the display of an image can be considerably reduced. In effect, in prior techniques, the data of all of the points of the screen were necessarily stored in a page memory, even if they were, for example, points which constituted a single color background, which led to redundance in the data to be stored; the invention provides for the composition of certain lines uniquely with the data of the corresponding word stored in the control memory, and this word can contain only four bytes instead of forty bytes if it is a line making up a part of a region of the intelligible information image. Due to the invention, such lines are not stored with the display data of all of the points except when it is actually graphical or typographical information.

In addition, it is sufficient for modifying the composition of the image, for animating it or for changing it in another way, to vary the addresses and/or the contents of the words of the control memory, so that the apparatus according to the invention presents a great flexibility in the processing of pages to be displayed on the screen.

According to one of the advantages of the invention, each word, stored in the control memory, for defining the contents of a line, is composed of base color information, of information regarding the number of memory planes and, if appropriate, of address information relating to a base address of a zone of said zone memory when the line is the first of a part of the image in which the intelligible information is to be displayed.

The invention will be more fully described in the following.

FIG. 4 shows the organization of the control memory in the device according to the invention.

It is known that a video image is created at the rate of frequency of a frame, each frame being generated by line sweeping. In a conventional video system, the control of the guns (red, green, blue) of the image tube results in signals which are completely analog. In a video system in a graphic mode, the guns are controlled by signals of a binary nature, one or zero, or, preferably, in a more advanced system, such as the present system, by a digital circuit which provides for the obtainment of a "color palette" with a particular number of shades of half-tones.

Each line of the frame is therefore composed of a particular number of points (320 in a typical example), each of which requiring three color information elements (R, G and B), on three bits.

In the conventional systems, during each frame display, synchronized with the video time base, the bytes containing the data relating to each image point are read in a memory called a "page memory" by means of a video display processor, or V.D.P., by means of which certain display functions can be effected. The page memory is fed by the central processing unit, the C.P.U. as a function of the input data which are expressed in a broadcast teletext standard, for example, by television channel or by telephone line. The V.D.P. also adapts the processing speed of the display elements to that of the C.P.U., it selects in the flow of input data the flags of the magazine or page, and effects other analogous functions. In another application, the C.P.U. can also execute a particular program for video games, for example.

Figure 1:
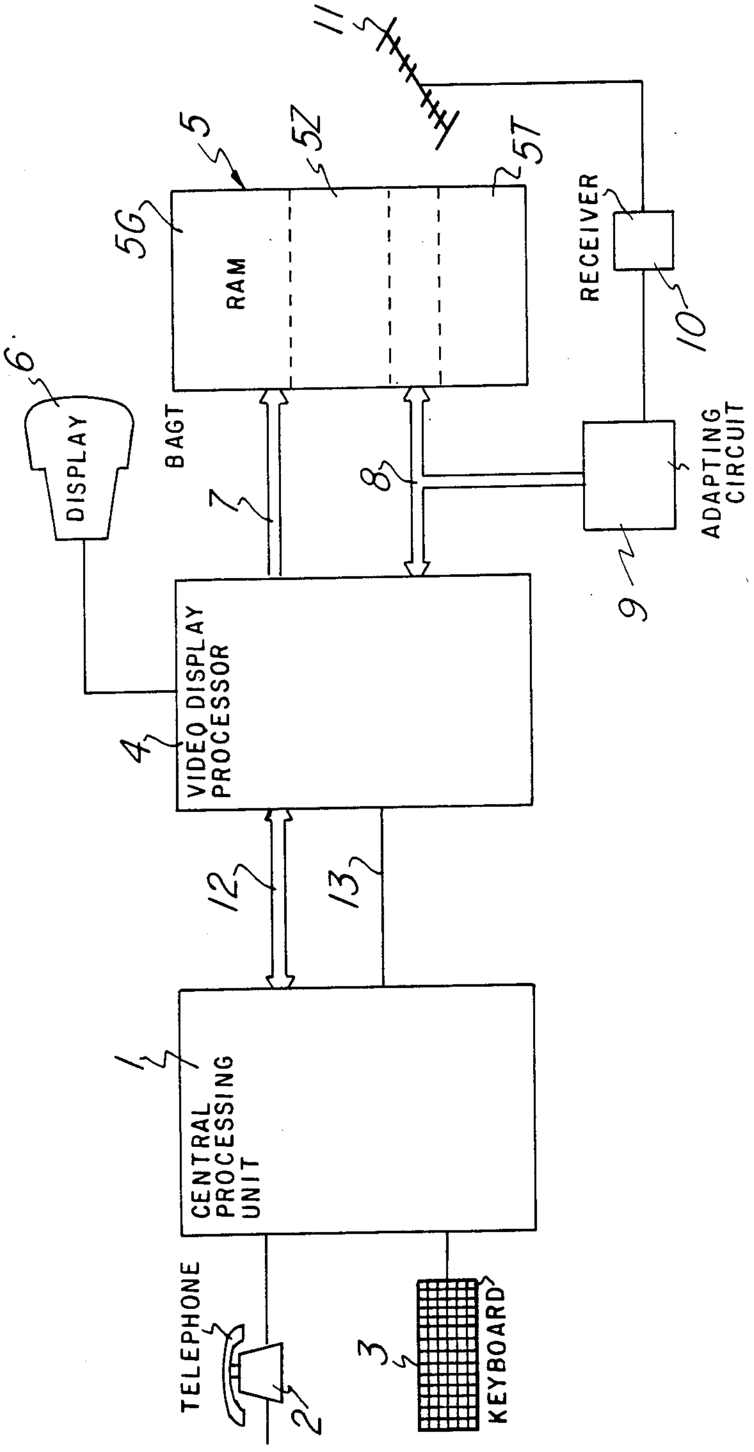
FIG. 1 is a general diagram of a video display system for a cathode screen in which the invention is incorporated.

In FIG. 1 is shown the general architecture of a teletext visualization system. It includes a central processing unit CPU 1 which is connected to one or more sources of information to be displayed. The source can be a telephone line over which passes information in teletext form, a local keyboard 3, or any other possible source such as for example a video game unit. The CPU is connected to a processor VDP 4 which is itself connected to a random access memory 5, the organization of which will be described hereinafter. The VDP is connected to a display screen 6. The invention will be illustrated in regard to displays on a cathode ray tube screen. However, the invention also finds application to all other displays utilizing frame sweeping, line by line, and point by point, as, for example, so called "flat screen" displays; also, the invention finds application to screens, which recently appeared on the market, called "plasma flat screens". All of these screens are considered as falling within the scope of the invention. The memory 5 communicates with VDP 4 by means of address bus 7 and data bus 8, this latter being connected to an adapting circuit 9 (called "Didon" in the literature) which provides for extraction of a video signal transmitted, for example, by means of a high frequency television carrier by hertzian line, the teletext information being multiplexed with the television signals of a conventional television system ("Antiope" for example). The adapting circuit 9 receives its input signal from receiver 10 which is itself connected to antenna 11. (For a brief description of the "Antiope" system, reference can be made to an article in "La Technique de l'Ingénieur", E. 3129).

In the example at hand, CPU 1 and VDP 4 are interconnected by a common bus 12 on which circulates, in time sharing, the address fields and the data fields; the assignment of these information fields is controlled by the CPU 1 by means of signal CM (mode control), which is generated in addition to the usual signals, address latch AL, data enable EN, and read write R/W, and which passes over control line 13. When the signal CM is at "1", all occurs as if the memory RAM 5 were directly connected to CPU 1 and controlled by the usual signals AL, EN, and R/W. On the other hand, when the signal CM is at "0", the address field loaded by the usual signals is interpreted as a control for the processor 4.

Figure 2:
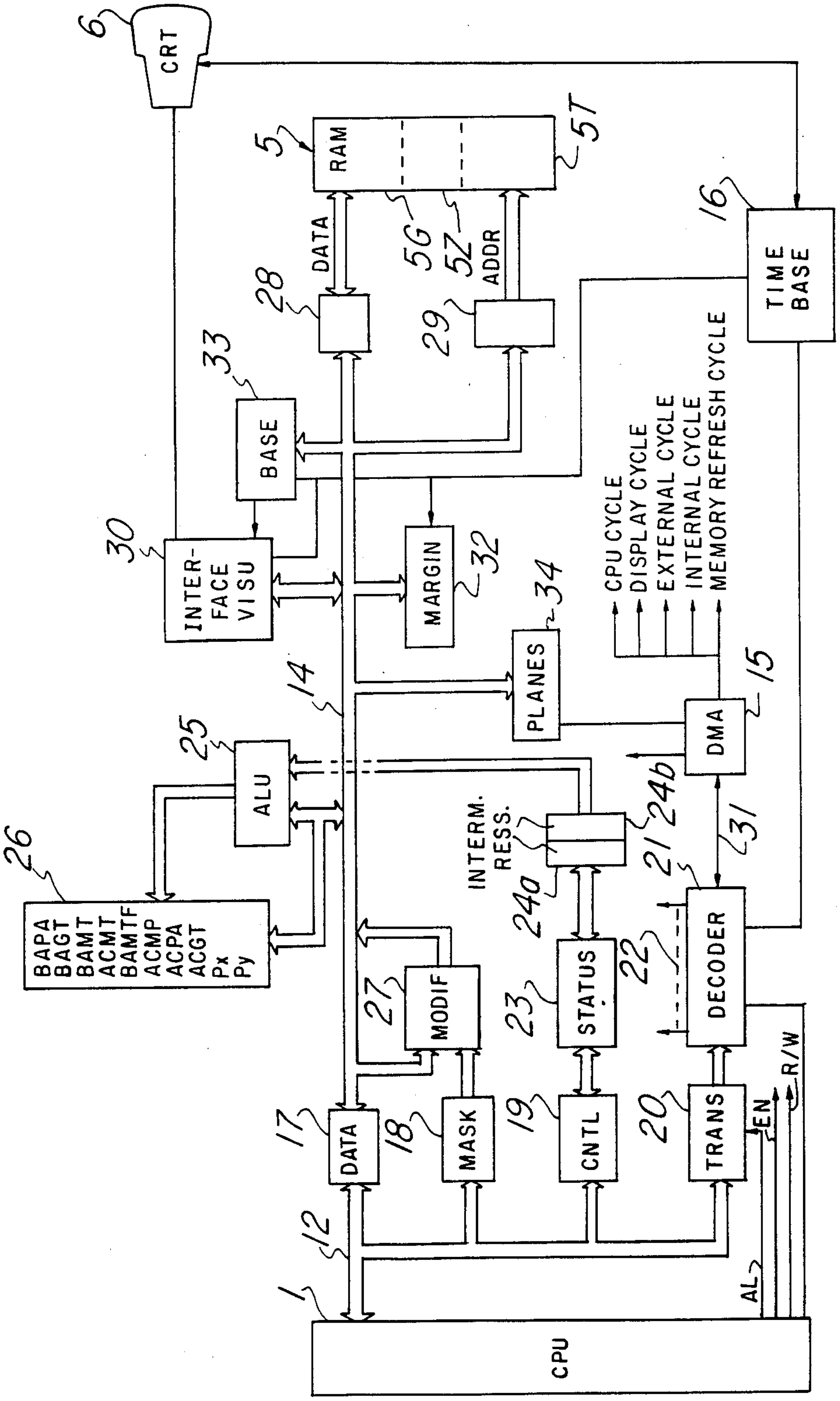
FIG. 2 is a diagram of the video processor which forms a part of the FIG. 1 display system.

FIG. 2 shows the general architecture of the VDP 4 which processes the address fields of CPU 1 as display function controls and which also can adopt a transparent configuration by means of which CPU 1 provides the appropriate address and data fields directly to memory 5, or receives the data from the memory as a function of the addresses which it applies directly to this memory (signal CM at 1 or at 0).

The VDP 4 includes internal bus 14 over which traverses all of the information exchanges which take place between CPU 1, memory 5, and the display device itself (screen 6).

The internal bus 14, which is bidirectional, transmits the address fields and the data fields in time sharing under control of a direct memory access device 15, hereinafter called DMA. This device can be of the type described in U.S. Pat. No. 4,240,138 entitled "System for Direct Access to a Memory Associated with a Mircroprocessor" claiming priority from French patent application No. 77 31130 filed Oct. 17, 1977 and U.S. patent application Ser. No. 583,071 filed Feb. 23, 1984 entitled "Apparatus Permitting Memory Access Time-sharing" claiming priority from French patent application no. 83 03143 filed Feb. 25, 1983, respectively, by the instant assignee. The DMA cooperates with a time base circuit 16 which controls, in particular, the synchronization of the sweeping of the screen 6.

The CPU 1 is connected to VDP 4 by bus 12 which is connected in parallel to a set of four registers 17, 18, 19 and 20. Register 17 is a data register in which each data field is temporarily stored before transmission on internal bus 14 to memory RAM 5. This register also functions to transmit the address fields adapted for directly addressing this memory, that is, those which are not VDP 4 functions.

Register 18 is a mask register and functions, in particular, to store a binary number which is decremented as the execution of a given function is carried out.

The register 19 is a control register. It can intervene for the execution of another function in the VDP, such as image movement on the screen, or others.

Register 20 is a transfer register for a function code represented by an address field provided by CPU 1, which represents a specific function to be executed. This register is activated only when the CPU indicates that the address field under consideration is to render the VDP non-transparent and ready to execute a particular function. The function code transfer register 20 is connected to a decoder 21 which receives the output of register 20 and selectively provides, upon reception of a particular code, enabling signals on outputs 22 which outputs are connected to the registers of the VDP, and this under control of the lead on which the CM signal is transmitted. In other terms, each code received provides for the sending of enabling signals on a certain number of outputs 22 activating registers of the VDP which come into play for the execution of the function represented by the code which was transmitted through the transfer register 20 and which came from CPU 1. The decoder communicates with DMA 15 when this latter is to provide the internal control of the VDP, and, more particularly, is to effect time sharing on bus 14 and which can also be controlled, in another manner, by the time base circuit 16, as will be seen.

The control register 19, as well as status register 23, which latter contains at each moment, information representing the internal status of the VDP and the instructions in the process of execution, and a double intermediate register 24a, 24b, are all connected to bus 12. The double register 24a, 24b is connected to an arithmetic and logical unit ALU 25 cooperating with register stack 26.

The mask register 18 is connected to a modification circuit 27, of which one of the inputs and the output are looped on internal bus 14. This bus is, in addition, connected at RAM memory 5 side to data registers 28 and address registers 29 which are directly connected to RAM memory 5.

An output interface 30 provides for the adaptation of the display data, transmitted on internal bus 14, and coming from all of the circuits of the VDP, the CPU 1, and memory 5, to the display circuits per se of screen 6.

The register stack 26 includes the following registers:

BAPA-address of the start of a zone of the zone memory.

BAGT-starting address of the control memory.

BAMT-starting address of the buffer memory.

ACMT-buffer memory pointer assigned to Didon circuit 9 (FIG. 1).

BAMTF-pointer of the end of buffer memory.

ACMP-pointer of the beginning of buffer memory on the CPU side.

ACPA-zone memory read pointer.

ACGT-control memory read pointer.

PX,PY-CPU processing pointers.

All of the registers described above, as well as ALU unit 25, are loaded or read under control of decoder 21 which is itself loaded either by CPU 1 or by time base circuit 16.

The visualization system includes a composite memory RAM 5 which includes zone memory 5Z, control memory 5G, and buffer memory 5T (FIG. 1), the ensemble being a single integrated circuit. Preferably, the limits assigned to these memories portions, in the integrated circuit, are not physically defined but only determined by the addresses of the beginning and/or end of the memory portion, which gives, to the system, a great degree of functional flexibility. The limits can thus vary during processing as a function of the information storage requirements of a particular moment.

The buffer memory 5T is, in particular, designed to adapt the processing speed of the Didon circuit 9 to that of CPU 1 as described in U.S. patent application Ser. No. 715,788 filed Mar. 23, 1985, entitled "Video Display Control System", a continuation of U.S. patent application Ser. No. 328,777 filed Dec. 8, 1981, claiming priority from French patent application no. 80 26392, filed Dec. 12, 1980 in the name of the instant assignee.

Figure 3:
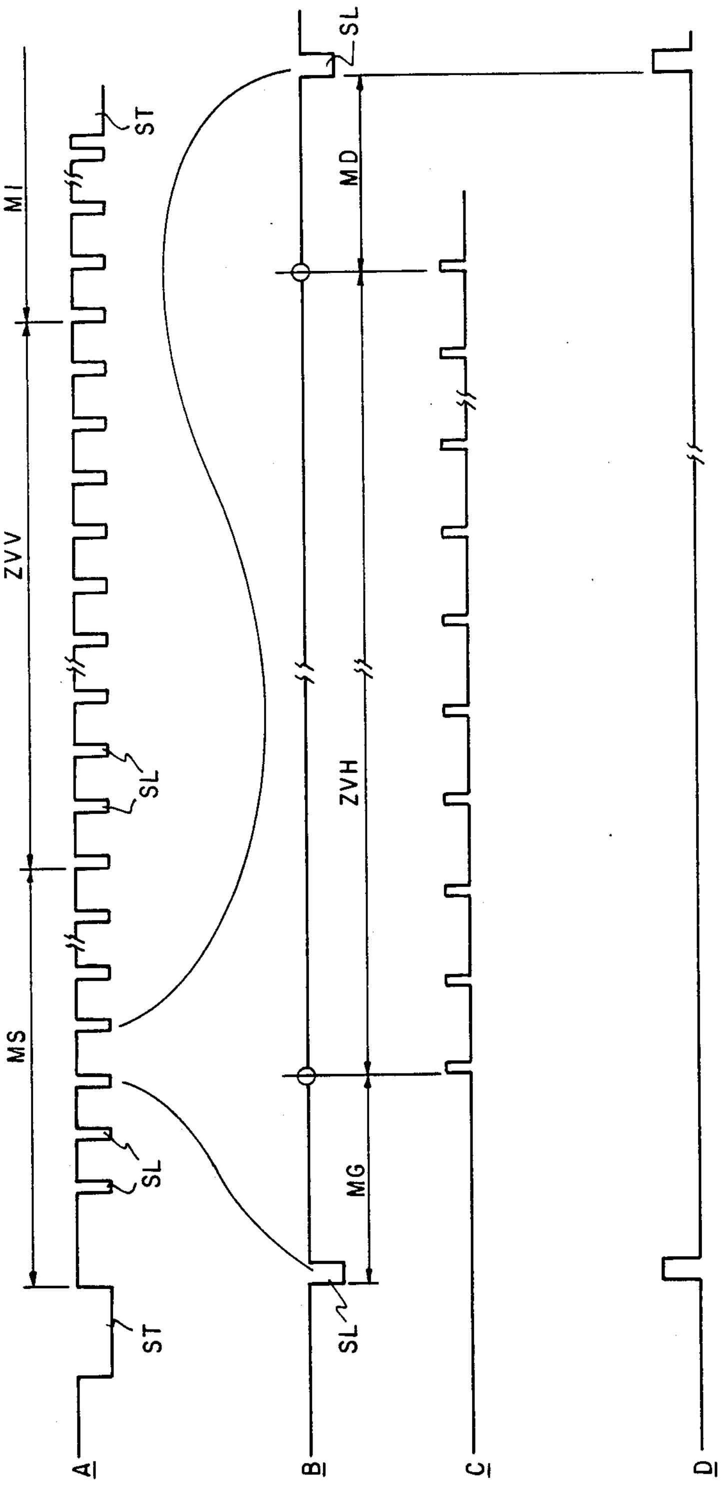
FIG. 3 is a diagram showing the time relation of the synchronization and control signals of the memory produced during the display of a frame.

Prior to continuing with the examination of FIG. 2, reference is made to FIG. 3, which represents a timing diagram of the sweep signals of the screen 6.

Each frame (line A) is defined between two frame synchronization pulses ST, between which are the line synchronization pulses SL.

In the present example, which corresponds to the norm of 625 lines per frame, the viewable zone ZVV containing the useful information occupies 250 vertical lines, it being understood that the display is carried out by successive interlaced frames as is conventional in video technology. There are thus, for each frame, 250 pulses SL for the viewable zone ZVV, this pulse train being preceded by, and followed by, a particular number of pulses corresponding to the upper and lower margins of the image, namely an upper margin MS, and a lower margin MI. The first and last lines of the viewable zone are marked by particular signals generated by time base circuit 16 (FIG. 2).

Line B of FIG. 3 represents, on a much enlarged time scale, the interval between two line synchronization pulses SL of the frame synchronization signal, this interval corresponding to the sweep duration of a line of the viewable zone ZVV.

The image on the screen includes a left hand margin MG, and a right hand margin MD, the viewable zone ZVH having a predetermined horizontal span which, in the example described, corresponds to a certain number of access cycles of the memory RAM 5, for example 40 access signals of a duration of 1.1 microseconds =44 microseconds. Thus, the sweeping of a line corresponds first of all to the monochrome display of the left hand margin of the image in a given color and then to the display of the information forming the image itself, and finally to the monochrome display of the right hand margin in the same color as the left margin.

The line C represents the access request signal of the memory which is provided by time base circuit 16 and which is transmitted over line 31 to DMA 15 and to decoder 21, this latter being enabled by this signal for activating the registers of VDP 4 necessary for display during the sweeping of the line in question.

The line D represents the pulses of the access requests of the control memory portion 5g of memory RAM 5. The corresponding signal also traverses line 31 so that DMA 15 can, at the appropriate times, that is, at the start of line sweeping, allocate an access time to the control memory 5g, and control the decoder 21 so that the register required at this moment can be enabled.

It is seen, therefore, that the visualization on the screen is controlled by the time base circuit which provides not only the signals required for sweeping the screen (frame synchro, line synchro) but also the signals for the margin, the requests for access to the memory portions of RAM 5, and a point clock signal, the pulses of which are for the display of each image point making up the components red, green and blue.

The VDP 4 also includes a margin register 32 which, at the beginning of each frame, is loaded by CPU 1 on being enabled by a signal from decoder 21. For this, this register is connected to bus 14 and its contents, which represent a color code for the margin, can be transferred to the interface 30, under control of time base circuit 16.

Figure 6:
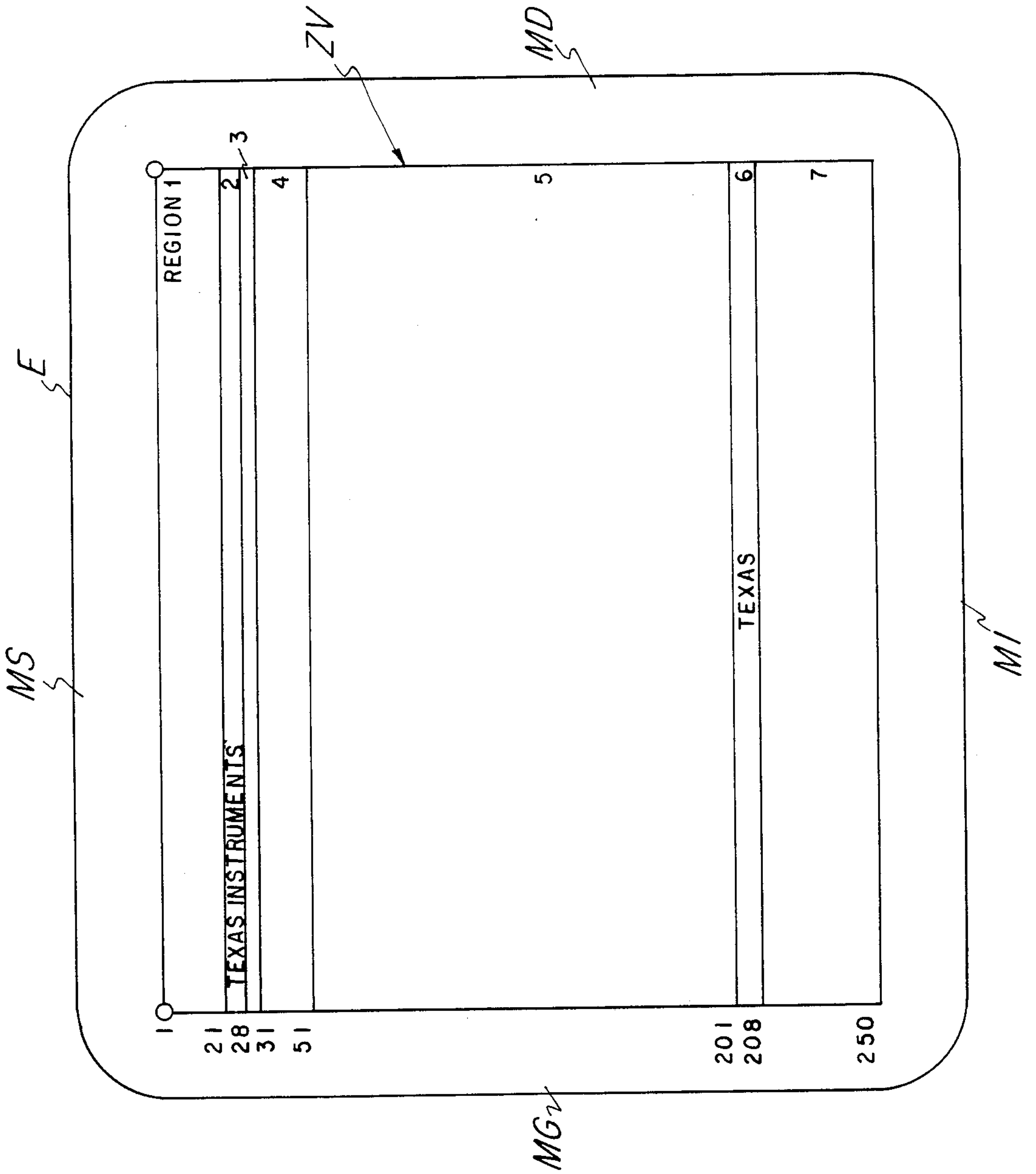
FIG. 6 shows the appearance of the cathode tube screen when the frame defined by the contents of the memory page and the control memory, such as seen in FIGS. 4 and 5, is displayed.

Another register 33 is adapted to memorize the background color of the viewable zone ZV of the screen (FIG. 6).

This register is connected to bus 14 so as to communicate with control memory 5g, which contains, for each line to be displayed, a background color code. The register 33 is connected to time base 16 so that it can, if required, be loaded during the line synchronization signal with a background color code which is contained in control memory 5g. It will be seen hereinafter that the background color code is utilized each time that no other color to be displayed is specified by the contents of the control memory 5g.

FIG. 4 represents the organization of the control memory 5g which comprises a part of memory RAM 5. The base address of this control memory is BAGT which can be loaded into the corresponding register of stack 26 by CPU 1 and can be transferred into the pointer register ACGT after the display of the upper margin MS when the display of the viewable zone ZV commences, that is, during the synchronization pulse of the first line of this zone. If the viewable zone is composed of 250 lines, the control memory 5g includes 250 rows of three bytes in which are loaded the following information.

Byte 1—background color (5 bits)
—number of memory planes (3 bits).

Byte 2 and 3—starting address (in hexadecimal) of a predetermined zone of the zone memory 5z.

Figure 7:
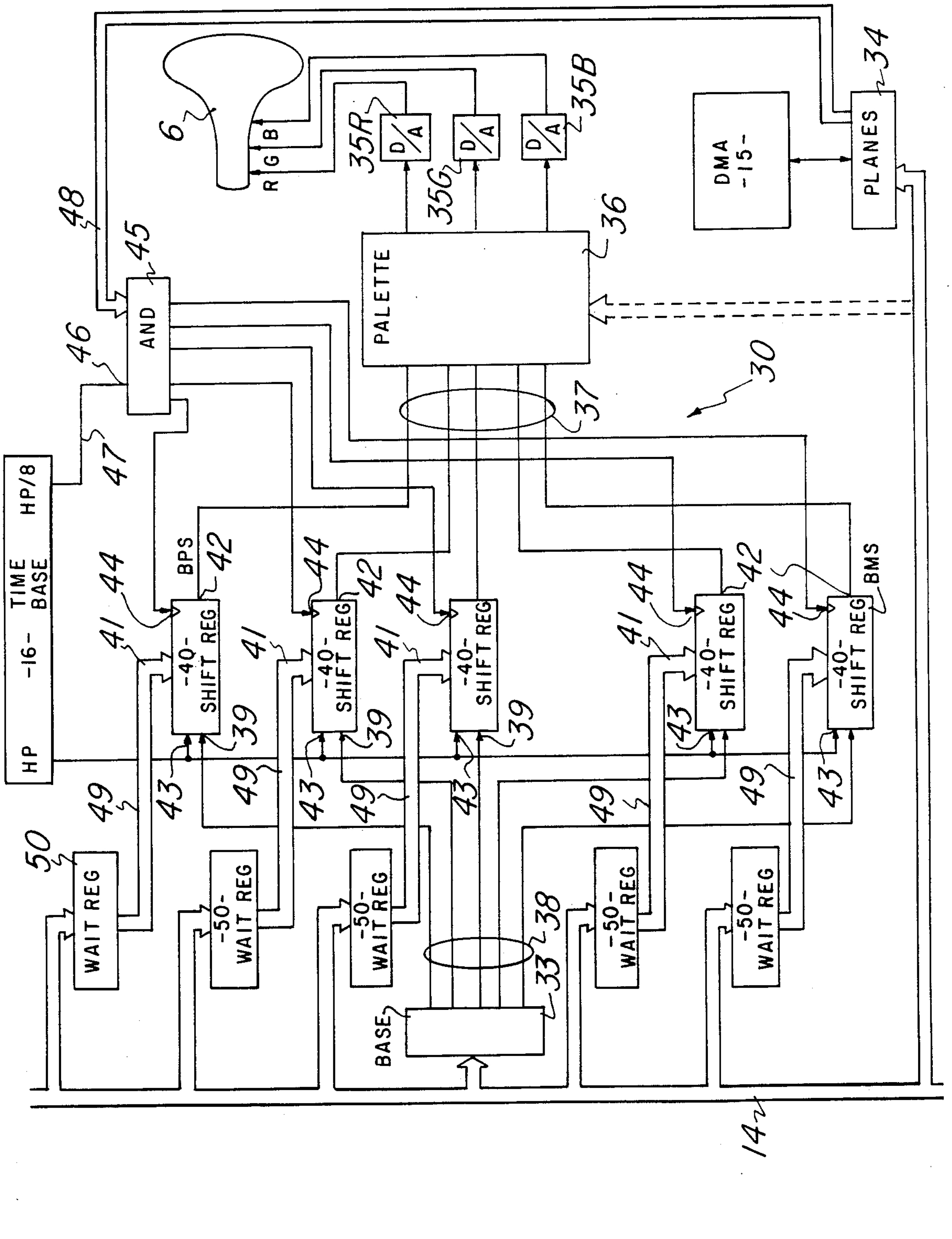
FIG. 7 is a simplified diagram of a part of the display interface of the video processor of FIG. 2 which provides for the display of the contents of the memory planes on the screen.

In the example set forth, the background color, the code of which is loaded into background register 33 at the start of each line, is thus coded on five bits which allows the obtainment of $2^5=32$ colors by means of interface 30. The background color appears "by default", that is each time that the three contiguous bits in the control memory 5g are zero, and the number of memory planes is equal to zero. For other lines, the display process is more complex and will be returned to during the description of the functioning of the interface 30 (FIG. 7).

Of course, each time that a line is displayed, the pointer ACGT is incremented by a unit to address the appropriate points in the control memory. This incrementation is effected by the logical and arithmetic unit 25, by the intermediary of DMA 15 and decoder 21.

The three bits representing the number of memory planes are loaded at the beginning of each line under consideration, into a plane register 34 (FIG. 2) which is decremented by DMA 15 at each column access of the zone memory 5z, when a group of bytes corresponding to a certain number of points of the screen must be extracted from this zone memory (for more details see U.S. patent application Ser. No. 583,071 cited above).

For this, the plane register 34 is connected to bus 14 and DMA 15.

FIG. 7 shows schematically display interface 30. The color inputs R, G and B of the tube 6 are connected respectively to three digital to analog converters 35R, 35G and 35B, to which have applied thereto the digital color signals from memory 36, which memory can be of the RAM or ROM type, and in which is stored a "color palette", which yields the name "palette memory" for this particular memory 36. This memory contains, either by means of programming by the CPU 1 via bus 14 (RAM), or in a fixed manner (ROM), a data series which, depending on the addresses, (which can be in 5 bits form), applied to the address inputs 37, can be extracted from the memory 36 to thereby determine colors of each point to be displayed on the screen. One can display a greater or a lesser number of colors depending upon the capacity of the arrangement and, in particular, the capacity of the color "palette". For example, the arrangement shown permits the selection from 32 colors for the display with the input to the "palette" being in five bit form. If there is a six bit input and 64 addresses, 64 colors can be displayed, etc. If, as is the example, five address inputs are provided, 32 different colors in total can be assigned to each image point. Of course, no matter what the maximum number of colors possible, each point can be displayed with a lesser number of colors, two for example, this number being determined for each line of the frame by the number of memory planes programmed for the line in question in the control memory.

The base color, taken "by default", is loaded into base register 33 (FIG. 7) at the beginning of each line. This register has five parallel outputs 38 which are connected respectively to the shift inputs 39 of five shift registers 40, each of these registers having a parallel input 41 on eight bits, and a serial output 42, which is connected to one of the address inputs 37 of the palette memory 36. The shifting rate of registers 40 is determined by time base circuit 16 which provides a signal "point clock", with one pulse per point of the video frame, to a clock input 43 of each register 40. Each of these registers also includes a loading control input 44 which authorizes loading of a word in the register only when a loading pulse comes from the output of the AND logic circuit 45. This latter is connected by its five outputs to the respective inputs 44 of all of the registers 40. A first input 46 of this logical AND circuit is connected to the time base circuit 16 which provides a control pulse HP/8 on line 47, each eight points displayed on the screen. The other input 48 of AND circuit 45 is connected to a plane register 34.

The parallel loading inputs 41 of the shift registers 40 are connected by bus 49 to eight bit delay registers 50 which are loaded from time sharing bus 14 under the control of circuit DMA 15, the data being extracted from the zone memory 5Z in successive column reading cycles which necessitate only single row addressing as is described in the U.S. patent application Ser. No. 583,071 cited above. It is to be noted that the loading of the delay registers is effected as a function of the number of memory planes, programmed in control memory 5g, and that this number also determines, for each loading cycle, the number of column readings to be executed. In addition, the loading capacity of the delay registers 50 and the shift registers being 8 bits, a loading of the registers corresponds to the color information necessary for displaying eight contiguous points on the screen.

The reason for the existence of the arrangement which has just been described is that circuit DMA controls the reading of the color data in a manner which is asynchronous with the display of points on the screen. It is only when the data are stored in the shift registers 40 and extracted from them that they become synchronous with the display under the control of the point clock of the time base circuit 16.

It is to be noted that this double loading arrangement would not be necessary if the extraction of point color data from zone memory 5Z were effected in a synchronous manner, which can be the case in a VDP which does not utilize the memory RAM 5 in time sharing.

Figure 5:
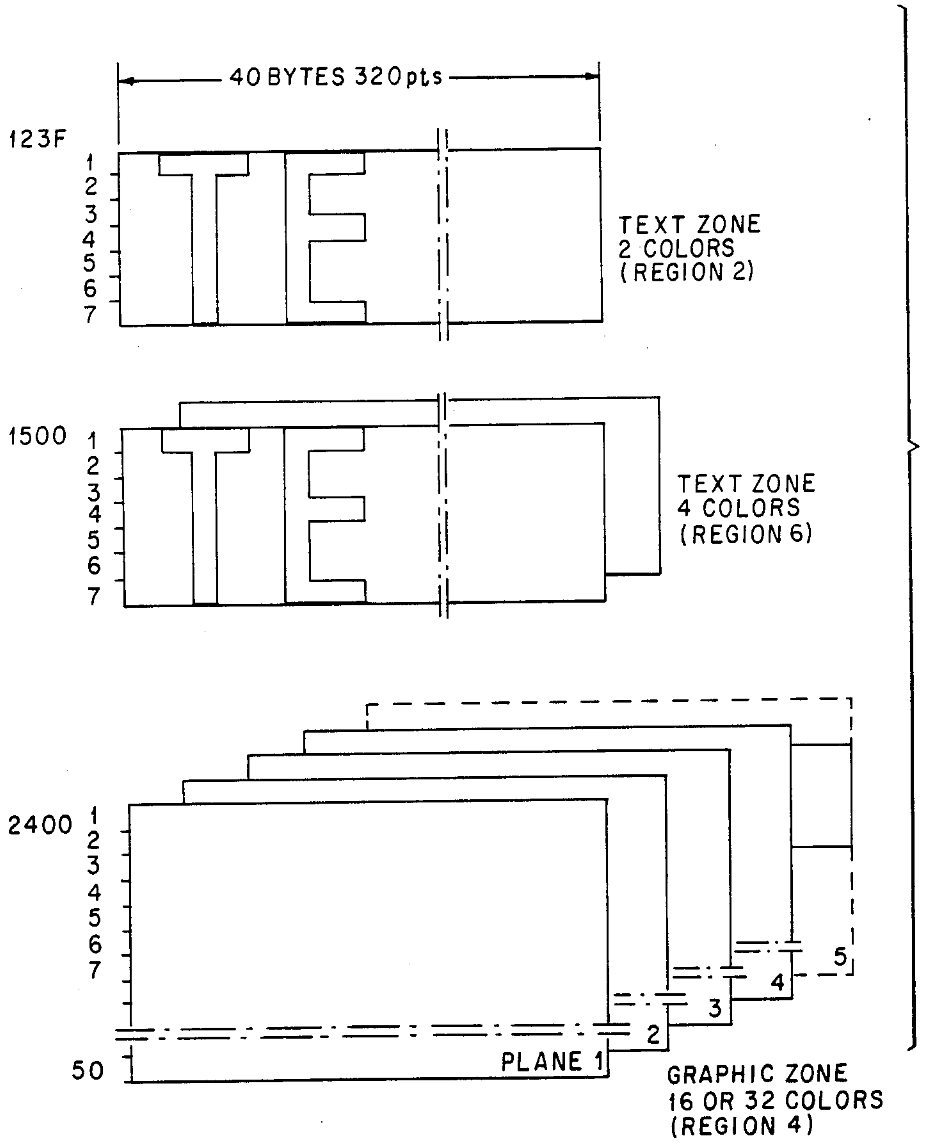
FIG. 5 shows schematically the contents of the page memory for the display of a frame on the cathode tube at a given moment.

There will now be described the functioning of the FIG. 2 circuit and the interface 30 of FIG. 7, with reference to FIGS. 4, 5 and 6. This description is in regard to the display of a single frame selected arbitrarily in an example with its appearance on the screen being seen in FIG. 6.

The viewable zone ZV of the screen E is surrounded by upper, lower, right and left hand margins MS, MI, MD and MG, as indicated above in regard to the time diagram of FIG. 3. The color of the margin is defined in margin register 32, which is loaded at the beginning of the display of the frame during the ST pulse.

The viewable zone includes 250 lines arranged in the following manner:

From line 1 to line 20: background color C1.

From line 21 to line 27: a one color text superimposed on a background color C2.

From line 28 to line 30: a background color C2.

From line 31 to line 50: a graphical image defined with four and five memory planes, that is, with sixteen and then thirty-two different colors selected from palette memory 36.

From line 51 to line 200: a background color C3.
From line 201 to line 207: a text in four colors.
From line 208 to line 250: a background color C4.

FIG. 4 shows that the contents of the control memory for the frame corresponds to that of the image defined, it being understood that the color defined in the first column of the table represents, in five bits, the background color of the image, or a base color, of a zone for this image, in which the characters or the graphical information are to be displayed.

The region 1 of the frame (FIG. 6), (below the upper margin which has already been displayed during the course of the sweeping of this frame), corresponds to 21 lines swept with the background color C1.

During the line synchro signal of line 1, the control memory is addressed at the address corresponding to the first row of FIG. 4, and the background register 33 is loaded with the code of the color C1 in five bits. This code is selectively applied to five registers 40 at their serial inputs 39. The color information will thus be shifted toward the right in the registers 40 and be applied in serial to the palette memory 36 under control of the point clock HP. Each point of the line being displayed is therefore displayed with the color C1 the code of which serves each time as an address for the palette memory 36. The address defined by this code corresponds to color information, in three bits, with which, after a digital/analog conversion. the guns R, G and B of the cathode tube are controlled for displaying the color C1.

As it is a background line, all of the points of line 1 (and the following until line 21) are displayed in the color C1 from the code loaded in the background register 33, the contents of which progress through the five registers 40 toward the palette memory 36.

The loading in parallel, in eight bits, of the registers 40 is inhibited during the display of these lines as plane register 34 is loaded at the start of the line with the number 000 and this causes the outputs of the logical circuit AND to be inhibited; the inputs 44 of the registers therefore are not enabled. Thus, no information transfer can take place from registers 50 to registers 40 and the pulses HP/8 (graphic C of FIG. 3) are ignored.

It is noted that the logic AND circuit 45, besides effecting an AND operation on clock output HP/8, has the function of decoding the information "number of planes" on the five inputs 44 of the registers 40, and an enabling signal for the parallel loading of these latter can not, therefore, appear except when the AND operation as to clock HP/8 and the decoded input "number of planes" information is positive.

This is the case for the display of lines 21 to 27. It is seen that, at the beginning of the sweeping of these lines, when the control memory is addressed, the background register 33 receives a color code C2 and the plane register receives the number 001. This information enables the input 41 of one of the five shift registers, for example, that register corresponding to the least significant bit BMS of the background register 33. It has also been seen that the contents of a line displayed with one or a plurality of memory planes, is defined in the zone memory 5Z by an address memorized in the control memory and which, for line 21, is 123F in hexadecimal. This address provides for a memory cycle controlled by the DMA 15 to obtain an byte which defines the contents of register 40, the parallel loading of which is enabled by the logical AND circuit 45. In other terms, the reading cycle of the memory is carried out by the DMA, in an asynchronous manner, before the time base circuit 16 provides the signal corresponding to the end of the left margin MG. The address byte 123F is therefore loaded into the waiting register 50 associated with the register 40 of BMS.

When the signal HP/8 appears for the first time, during line sweeping, on conductor 47, the loading of register 40 of BMS is effected in parallel with the bits of the byte which were held in the corresponding register 50. The bits BMS coming from background register 33 are "suppressed" by this loading and the color code which is extracted for the eight first points of the line after the margin will be defined by the four most significant bits BTS, to which will be joined successively, during the shifting of the contents of registers 40, the bits loaded in the register 40 of BMS. Stated otherwise, if the color C2 is defined by a code 10110, for example, the palette memory will receive, as successive addresses, either the word 10110 or the word 10111, depending upon the byte loaded into register 40 of BMS. The palette memory will successively provide, for the eight points to be displayed, the color C2 (as the base color) and the color C2' with which one can display the characters as is seen in FIG. 6 in the image region 2. It is to be noted that, throughout the display of the line in question, the four other registers 50 are not utilized, and the parallel loading of registers 40 is not enabled, so that these latter registers continue to advance the four most significant bits of the background register 33 (in the example the bits 1011 . . . ).

The loading of register 40 BMS is effected, each eight points by the signal HP/8 under control of DMA 15 and this by the addressing of the zone memory 5Z at the addresses defined by the incremention, unit by unit, of the base address of this zone 123F. This incremention is effected by ALU 26 and DMA 15 in the pointer ACPA. In the example, the viewable portion ZVH of each line corresponds to 40 accesses of the zone memory and each access takes place during the display of the eight points in question, for the display of the eight following. It is only the parallel loading of the register (s) 40 from registers 50 which is synchronous with clock HP/8, from the line synchronization signals of time base 16.

From line 28 on, there is a return to functioning without memory planes and the plane register again receives the code 000. During lines 28, 29 and 30, the display is effected with background color C2, 10110, as during lines 1 to 20, by means of shifting of information "background" in the five registers 40 of the interface 30. The region 4 corresponds to the display of graphical information (lines 31 to 51). In this case, the first byte of rows corresponding to the control memory 5G contains a code which defines a base color C5, while the number of memory planes is selected initially to be 4 (lines 31 and 32) then 5 (lines 33, 34 and 35), then again 4, until line 51.

For displaying the first group of eight points of the line 31, a multiple access is made to the zone memory 5Z from the address 24.00; each access corresponds to a single row cycle for four column cycles of this zone memory. This access is effected in an asynchronous manner by DMA 15 during the display of the left hand margin of line 31.

The plane code 100 enabled the loading of the four registers 40 from register BMS such that when the signal "end of margin" appears, which signal is furnished by time base circuit 16, the contents of the addresses of the zone memory set forth starting from the address 2400, and loaded by the DMA in four delay registers 50, are transferred into register 40. In these conditions, when the point clock H shifts the contents of the registers 40 for the display of eight first points of the line 31, the register 40 BPS will continue to apply to the palette memory 36, the bit BPS of the background register 33, while all the other registers 40 provide the bits the values of which are defined by the contents of the bytes which the registers previously received during the transfer to the bus 49 of the contents of the corresponding registers 50.

That is, there can be defined sixteen colors for the display of the points in question, as sixteen emplacements of the palette memory can be addressed by means of inputs 37.

The loading of registers 50 is effected each eight points in order to define the colors of the following eight points, as was the case during the display of the two color lines, 21 to 27.

It is understood that, from line 33 until line 36, the logical circuit 45 authorizes the loading of all the registers 40 so that, in this case, the contents of background register 33 are no longer utilized, and the bits shifted in the registers 40 are not being determined except by the contents of the zone memory to the corresponding addresses. In these conditions, one can display using all of the colors of the palette 36, which are 32 in number.

During the display of the region 5, one returns to functioning by means of the contents of the base color register 33 only, of which the contents progress bit by bit via the registers 40 under control of point clock H as described above.

During the display of lines 201 to 207, enabling is not authorized except in regard to two registers 40 only, and thus one obtains display by means of four colors with one base color, corresponding to the code loaded into the background register (10101 for example), and three other possibilities provided by the variation in the value of BMS (codes 10100, 10110 and 10111 respectively).

The loading of the two registers 40 BMS is effected in the same manner as above.

Thereafter, the display of the frame is terminated during the lines 208 to 250 by a color code C4 defined only in the background or base color register 33.

What is claimed is:

1. A control apparatus for a raster scan video display having a plurality of video display lines comprising:

a composite memory for storing data indicative of a video display including a managing memory having a plurality of line composition data words, one line composition data word for each video display line, each line composition data word indicating the composition of the data for the corresponding video display line, and a zone memory having a plurality of memory zones, one memory zone corresponding to each video display line, each memory zone including image data indicative of the image data having the corresponding video display line, said image data having the composition indicated by the corresponding line composition data word:

a central processing unit connected to said composite memory for controlling the composition of the video display by controlling the data stored in said managing memory and said zone memory:

a time base unit for generating time base signals in synchronization with the raster scan of the video display; and a video display processor connected to said composite memory and said time base unit for generating at least one video display control signal for formation of the video display by recall of said line composition data word from said managing memory corresponding to the current video display line, recalling said image data from said zone memory corresponding to successive pixels of the current video display line and forming said at least one video control signal in accordance with said recalled image data for each pixel of the current video display line by interpreting said image data in accordance with said composition indicated by said recalled line composition data word.

2. A control apparatus for a raster scan video display as claimed in claim 1, wherein:

each line composition data word of said managing memory includes data indicative of a background color, and data indicative of the number of memory planes of the image data corresponding to the video display line; and each memory zone of said zone memory includes image data having the number of memory planes indicated by said corresponding line composition data word.

3. A control apparatus for a raster scan video display as claimed in claim 1, wherein:

each line composition data word of said managing memory includes data indicative of a background color, data indicative of the number of memory planes of the image data corresponding to the video display line, and data indicative of the base address of the memory zone within said zone memory corresponding to said line composition data word; and each memory zone of said zone memory starts at an address corresponding to said base address indicated by said corresponding line composition data word, and includes image data having the number of memory planes indicated by said corresponding line composition data word.

4. A control apparatus for a raster scan video display as claimed in claim 3, wherein:

said video display processor includes a base color register loaded at the start of each video display line with the base color indicated by the corresponding line composition data word, and a plane number register loaded at the start of each video display line with the number of memory planes indicated by said corresponding line composition data word.

5. A control apparatus for a raster scan video display as claimed in claim 4, wherein:

said video display processor further includes a plurality of shift registers equal to the maximum number of memory planes of any zone memory having a predetermined number of stages connected to said time base unit for shifting data at a rate corresponding to the pixel rate of said video display, each of said shift registers having a serial input connected to a corresponding bit of said base color register, a parallel input for receiving image data from said corresponding memory zone of a single color plane of said predetermined number of adjacent pixels, a parallel load control input and a serial output, a memory plane control circuit connected to said time base unit, said plane number register and said parallel load control input of each of said shift registers for enabling the parallel loading of a predetermined set of said shift registers equal in number to said number of memory planes stored in said plane number register at a rate equal to said pixel rate divided by said predetermined number of stages of said shift registers, a color palette connected to said serial outputs of said shift registers having color data words stored at a plurality of address locations therein for forming said at least one video control signal by recall of color data words from addresses corresponding to said outputs of said shift registers, whereby said address corresponds to said image data parallel loaded into each of said selected set of shift registers and said base color serial loaded into the other shift registers.

6. A control apparatus for a raster scan video display as claimed in claim 5, wherein:

said video display processor further includes a plurality of waiting registers equal in number to the number of said shift registers, each connected to said zone memory and to a corresponding shift register, for temporarily storing said image data from said corresponding memory zone of a single color plane of said predeterminednumber of adjacent pixels in advance of parallel loading of said image data into said corresponding shift register.

7. A control apparatus for a raster scan video display comprising:

a composite memory for storing data indicative of a video display including a managing memory having a plurality of line composition data words, one line composition data word for each video display line, each line composition data word indicating the composition of the data for the corresponding video display line, and a zone memory having a plurality of memory zones, one memory zone corresponding to each video display line, each memory zone including image data indicative of the image of the corresponding video display line, said image data having the composition indicated by the corresponding line composition data word;

a time base unit for generating time base signal in synchronization with the raster scan of the video display; and a video display processor connected to said composite memory and said time base unit for generating at least one video display control signal for formation of the video display by recall of said line composition data word from said managing memory corresponding to the current video display line, recalling said image data from said zone memory corresponding to successive pixels of the current video display line and forming said at least one video control signal in accordance with said recalled image data for each pixel of the current video display line by interpreting said image data in accordance with said composition indicated by said recalled line composition data word.

8. A control apparatus for a raster scan video display as claimed in claim 7, wherein:

each line composition data word of said managing memory includes data indicative of a background color, data indicative of the number of memory planes of the image data corresponding to the video display line, and data indicative of the base address of the memory zone within said zone memory corresponding to said line composition data word; and each memory zone of said zone memory starts at an address corresponding to said base address indicated by said corresponding line composition data word, and includes image data having the number of memory planes indicated by said corresponding line composition data word.

9. A control apparatus for a raster scan video display as claimed in claim 8, wherein:

said video display processor includes a base color register loaded at the start of each video display line with the base color indicated by the corresponding line composition data word, a plane number register loaded at the start of each video display line with the number of memory planes indicated by said corresponding line composition data word, a plurality of shift registers equal to the maximum number of memory planes of any zone memory having a predetermined number of stages connected to said time base unit for shifting data at a rate corresponding to the pixel rate of said video display, each of said shift registers having a serial input connected to a corresponding bit of said base color register, a parallel input for receiving image data from said corresponding memory zone of a single color plane of said predetermined number of adjacent pixels, a parallel load control input and a serial output, a memory plane control circuit connected to said time base unit, said plane number register and said parallel load control input of each of said shift registers for enabling the parallel loading of a predetermined set of said shift registers equal in number of said number of memory planes stored in said plane number register at a rate equal to said pixel rate divided by said predetermined number of stages of said shift registers, a color palette connected to said serial outputs of said shift registers having color data words stored at a plurality of address locations therein for forming said at least one video control signal by recall of color data words from addresses corresponding to said outputs of said shift registers, whereby said address corresponds to said image data parallel loaded into each of said selected set of shift registers and said base color serial loaded into the other shift registers.

* * * * *